US007363942B2

(12) United States Patent
Fernandez

(10) Patent No.: US 7,363,942 B2
(45) Date of Patent: Apr. 29, 2008

(54) CONTINUOUS AUTOMATIC CONTROL AND DISTRIBUTOR VALVE, WITH A MAGNETIC SEAL

(75) Inventor: Angel Valero Fernandez, Valencia (ES)

(73) Assignee: Irrimon, S.A.U. (ES)

( * ) Notice: Subject to any disclaimer, the term of this patent is extended or adjusted under 35 U.S.C. 154(b) by 229 days.

(21) Appl. No.: 10/530,235

(22) PCT Filed: Sep. 29, 2003

(86) PCT No.: PCT/ES03/00492

§ 371 (c)(1),
(2), (4) Date: Mar. 2, 2006

(87) PCT Pub. No.: WO2004/031633

PCT Pub. Date: Apr. 15, 2004

(65) Prior Publication Data

US 2006/0169336 A1 Aug. 3, 2006

(30) Foreign Application Priority Data

Oct. 2, 2002 (ES) ................................ 200202241

(51) Int. Cl.
  *F16K 11/00* (2006.01)
(52) U.S. Cl. ............ 137/625; 137/625.25; 137/625.41; 137/870; 137/872; 137/625.12; 251/11; 251/65; 251/129.01

(58) Field of Classification Search ................ 137/625, 137/625.21, 625.25, 625.41, 625.4, 625.46, 137/625.48, 867, 868, 870, 872, 625.12, 137/625.15, 625.17; 251/65, 129.01, 11
See application file for complete search history.

(56) References Cited

U.S. PATENT DOCUMENTS

| 2,322,658 | A | * | 6/1943  | Overbeke ................... 137/872 |
| 3,486,517 | A | * | 12/1969 | Gaura ........................ 137/872 |
| 3,587,650 | A |   | 6/1971  | Denker |
| 4,783,050 | A |   | 11/1988 | Hugler |
| 4,964,433 | A |   | 10/1990 | Marietta |
| 4,965,545 | A | * | 10/1990 | Johnson ....................... 60/527 |
| 5,865,418 | A | * | 2/1999  | Nakayama et al. ........... 251/11 |
| 5,967,485 | A | * | 10/1999 | Neuhaus ...................... 251/11 |

FOREIGN PATENT DOCUMENTS

GB          1 449 258       9/1976

* cited by examiner

*Primary Examiner*—Ramesh Kirshnamurthy
*Assistant Examiner*—Craig Price
(74) *Attorney, Agent, or Firm*—Ostrolenk, Faber, Gerb & Soffen, LLP

(57) ABSTRACT

A valve which is composed of: —A seal consisting of two identical ferromagnetic discs (1), which enclose another smaller-diameter disc (2) and a permanent magnet, the rims (3) of the outer discs (1) being bevelled and the three discs conjointly forming a perimeter groove housing a spring ring (4), —A valve body in two superimposed parts (5)-(5') with an intercommunicating chamber (6), inside which the rolling movement of the seal can take place, —Seal movements means consisting of: a bi-metal conductor (8) and an opposing spring (9).

1 Claim, 4 Drawing Sheets

A-A

A-A

B-B

CONTINUOUS AUTOMATIC CONTROL AND DISTRIBUTOR VALVE, WITH A MAGNETIC SEAL

PRIORITY CLAIM

This is a 35 U.S.C. § 371 National Stage of International Application No. PCT/ES2003/000492, filed on Sep. 29, 2003. Priority is claimed on that application and on the following application:

Country: Spain, Application No. P200202241, Filed: Oct. 2, 2002.

OBJECT OF THE INVENTION

The object to which the invention protected in this Patent refers consists of a "continuous automatic fluid flow control and distributor valve, with a magnetic seal".

The valve that is the object of the Patent is of the type of those that permit the distribution of the flow of a fluid among three inlet and outlet ways, one of which is shared and remains open all the time, while the other two are the progressive opening and closing type.

BACKGROUND OF THE INVENTION

Numerous electrovalves (solenoid valves) are known, in which their sealing element is operated by the effect of a magnetic field generated by a coil, moving in the direction of its longitudinal axis as determined by said field, which is created in the body of the valve in which it is housed.

This type of valve has the disadvantage that its action can only be "all or nothing", i.e. with complete opening or closing of the fluid inlet or outlet ports, with no possibility of regulating the through-flow by means of the partial opening or closing of said ports.

Furthermore, on the known valves the movement of the seal in the longitudinal direction requires a relatively high energy consumption to overcome the opposition presented by the actual pressure of the fluid and, when applicable, the back force of the opposing spring, which tends to return the seal to its starting position.

DESCRIPTION OF THE INVENTION

The purpose of the invention which represents the object of this Patent consists of the creation of a valve which overcomes the above-described drawbacks typical of solenoid valves and permits the regulation of the fluid flow distributed in its interior, for which purpose it has been devised, studied, designed and tested.

The essential technical guidelines that have governed the development of the new valve and have been the cornerstones of its originality are as follows:

Use of a permanent magnetic field to achieve the sealing of the ports, overcoming the opposing pressure of the fluid.

Configuration of the cylindrically-shaped seal.

Arrangement of the seal with its axis perpendicular to the inlet and outlet directions of the fluid flow which is distributed and controlled.

Movement of the seal by transverse rolling instead of by sliding in an axial direction, as in conventional solenoid valves.

Actuation of the rolling movement of the seal, preferably by means of a bi-metal element subjected to electrical voltage and an opposing return spring.

The physical embodiment of these technical guidelines is achieved by means of the structure of the new valve, consisting of the following components:

A cylindrically-shaped seal made up of two identical ferromagnetic discs which together enclose a third concentric disc of smaller diameter and a permanent magnet, the edges of the two outer discs being bevelled towards the inner magnetic disc, in such a way that the three discs conjointly define a perimeter groove that houses a spring ring, which constitutes the direct means of sealing.

A valve case or body consisting of two superimposed parts, one of which forms the rolling path of the outer discs with the bevelled edges of the seal and is of ferromagnetic material, being provided with an intercommunication chamber between the fluid distribution ways (inlets and outlets), which have dimensions that permit small movements to take place in its interior due to the rolling of the seal, the axes of the inlet and outlet ways or vice versa being disposed perpendicularly.

Seal movement means consisting of: a bi-metal conductor capable of contracting when an electrical voltage is applied to it, causing with its contraction the rolling movement of the seal; and an opposing spring, disposed to keep the seal either in dynamic equilibrium or else to take it to its home position when no electrical voltage is applied to the bi-metal conductor.

The electrical voltage applied to the conductor may be regulated manually or automatically, in the latter case using an electronic device that receives information by way of sensors on the magnitude of the variables (pressure, temperature of the fluid, etc.) which it is intended to stabilise and disposes the rolling of the seal in one direction or the other by means of said regulation, with limitation of said movement by lateral stops.

In any case, with its rolling movement the seal gradually opens or closes the ports of two of the valve ways, which are aligned in the rolling path of the seal, thereby distributing the flow of the fluid between said ways.

Furthermore, the rolling of the seal over the ports permits their gradual opening or closing, thus regulating the flow rate of the fluid with precision over a wide range, as the seal is stable in all positions thanks to its dynamic equilibrium owing to the fine compensation of the forces that determine its movement in opposing directions.

From the foregoing description of the functional features of the valve, it is made quite clear that it is properly classed as a "continuous automatic fluid flow control and distributor valve, with a magnetic seal".

DESCRIPTION OF THE DRAWINGS

To supplement the description of the invention and facilitate the interpretation of the formal, structural and functional features of its object, drawings are attached representing diagrammatically different aspects of a preferred embodiment of the continuous automatic fluid flow control and distributor valve, with a magnetic seal, that constitutes the object of this Patent. In said drawings.

PREFERRED EMBODIMENT OF THE INVENTION

Figure 1:
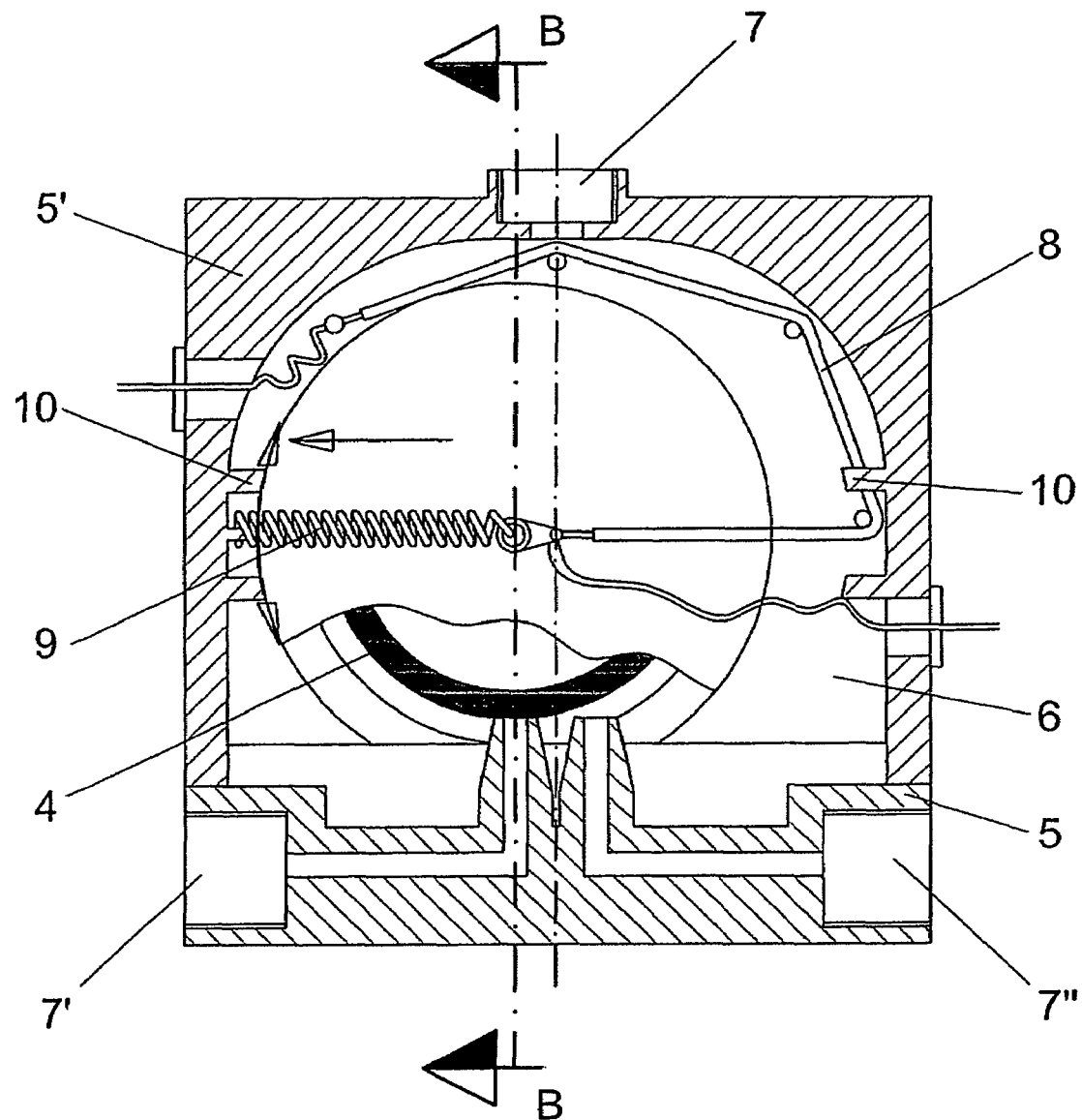
FIG. 1.—represents a longitudinal section of the valve, cut along the plane whose line is marked as A-A in FIG. 2. In this FIG. 1, the seal lies at one limit of its sideways movement, establishing communication between one of the adjustable ways and the shared way.
Figure 2:
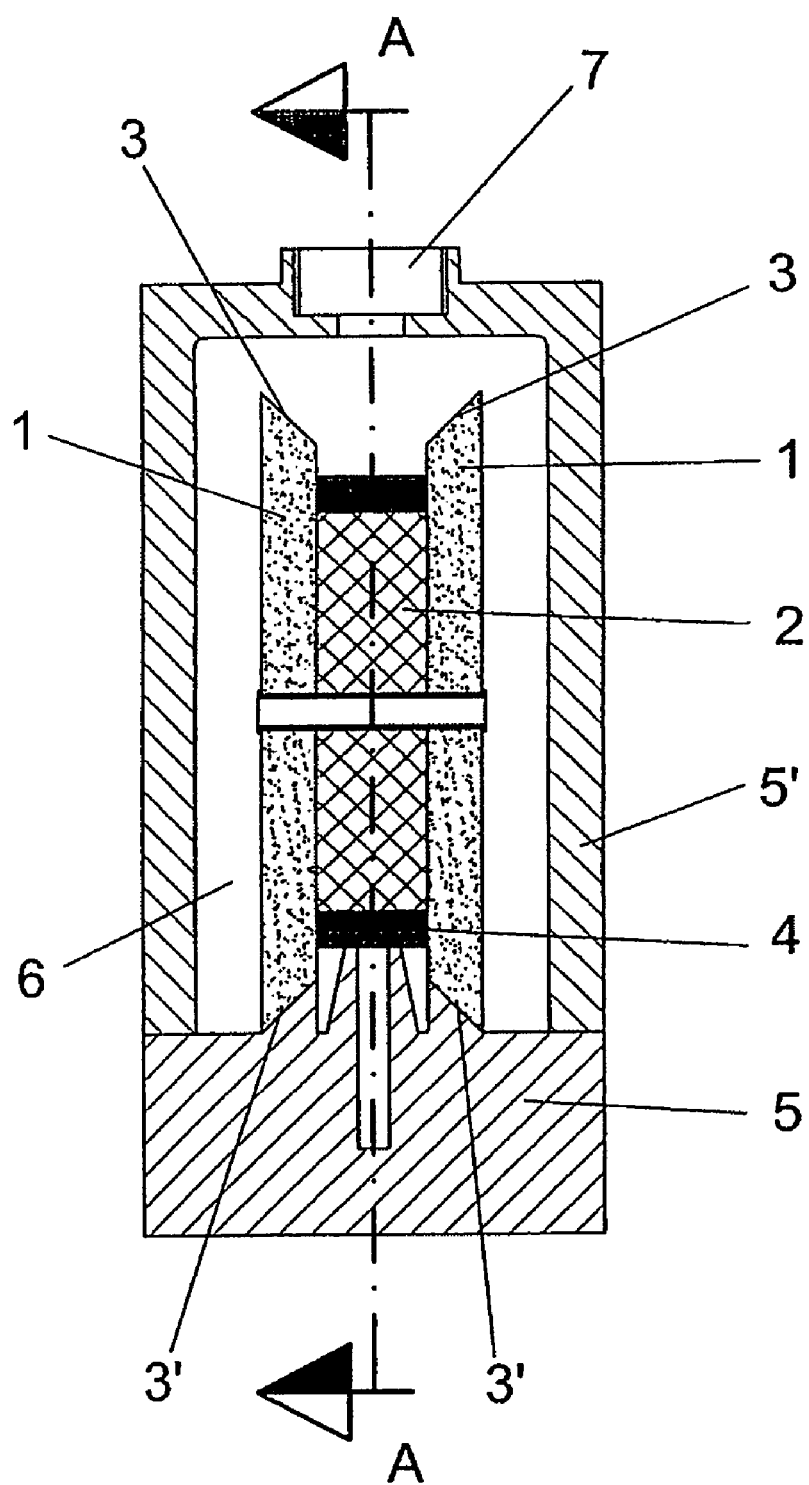
FIG. 2.—is a cross section of the valve, cut along the plane whose line is marked as B-B in FIG. 1.
Figure 3:
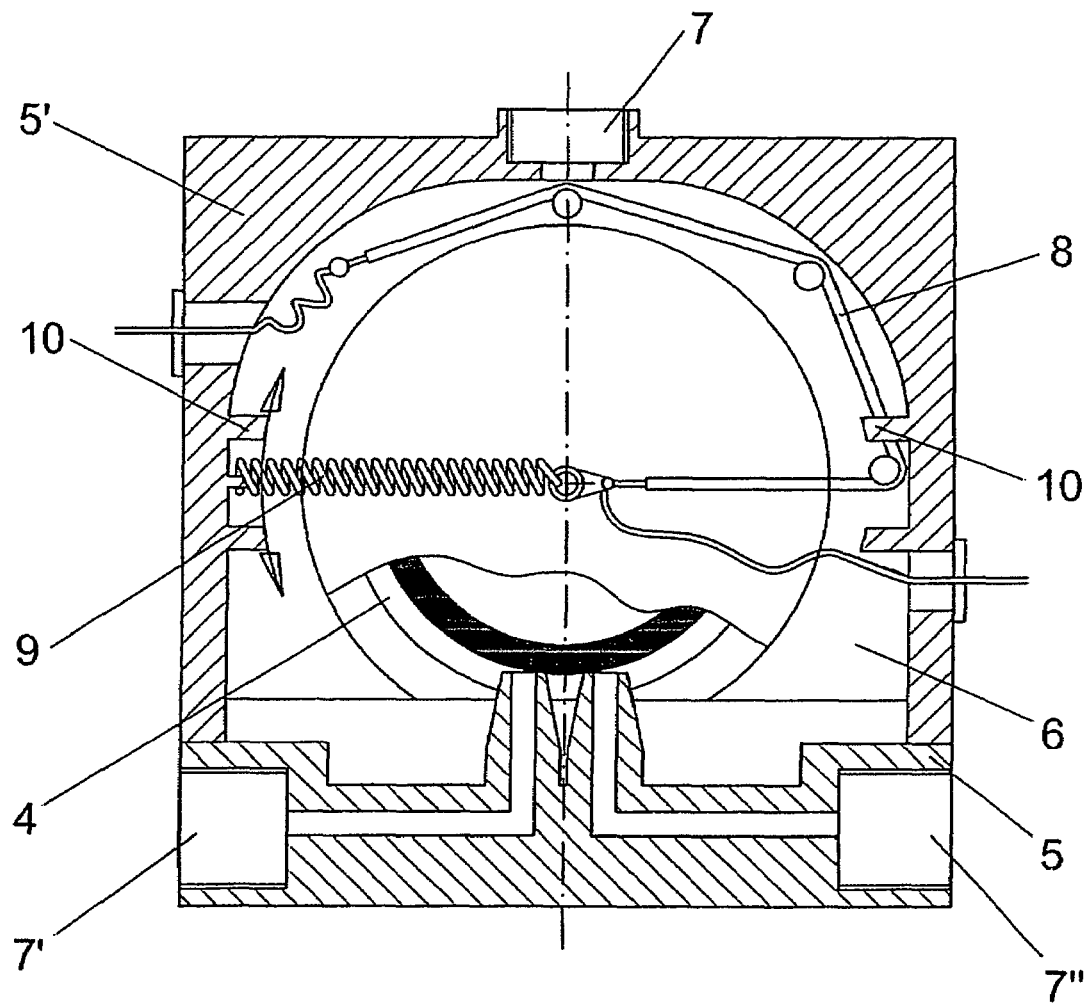
FIG. 3.—is also a longitudinal section of the valve, cut along the plane which is marked as A-A in FIG. 2, although the seal appears centred in it, intercommunicating the three ways in a limited manner.
Figure 4:
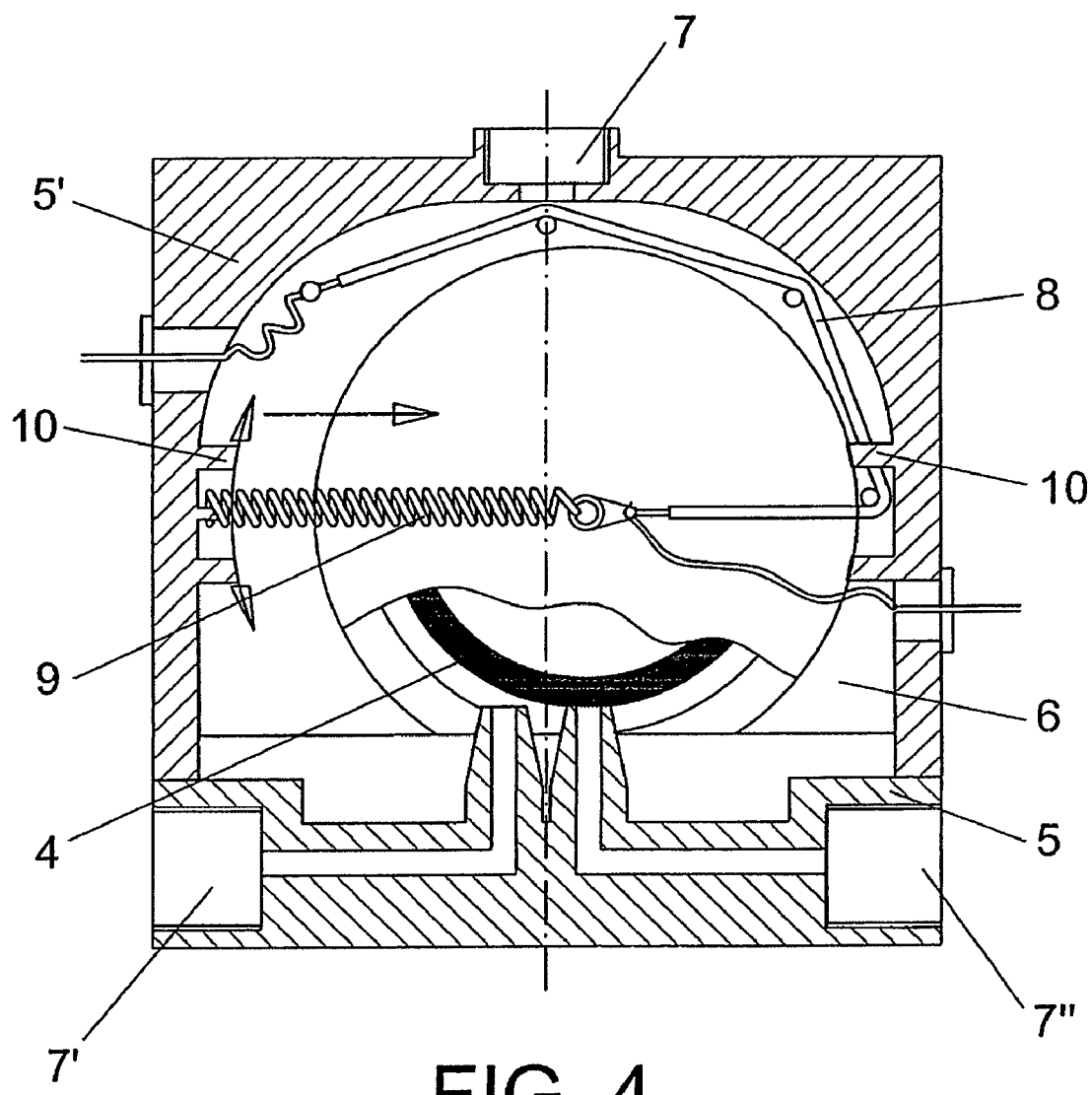
FIG. 4.—shows the same section of FIGS. 1 and 3, but with the seal at the limit of its sideways movement opposite to that of FIG. 1, establishing communication between the adjustable way opposite the open one in FIG. 1 and the shared way.

To show with clarity the nature and scope of the advantageous application of the continuous automatic fluid flow control and distributor valve, with a magnetic seal, which is the object of the invention, its structure and operation are described, making reference to the drawings, which, through representing a preferred embodiment of said object, for informative purposes only, should be taken in their broadest sense and not as limiting the application and the content of the invention claimed.

The valve that constitutes the object of the Patent is of the type of valves that permit the flow of a fluid to be distributed among three inlet and outlet ways, one of which (7) is shared and remains open all the time, while the other two (7')-(7") are the progressive opening and closing type.

The structure of the new valve is composed of the following components:

A cylindrically-shaped seal made up of two identical ferromagnetic discs (1), which enclose between them another smaller-diameter concentric disc (2) and a permanent magnet, the rims (3) of the two outer discs being bevel-cut towards the inner magnetic disc (2), with the result that the three discs conjointly define a perimeter groove that acts as a housing for a spring ring (4) which forms the direct means of sealing.

A valve case or body composed of two superimposed parts (5)-(5'), one of which (5') forms the rolling track of the outer discs with the bevelled edges of the seal and is of ferromagnetic material, being provided with an intercommunicating chamber (6) between the fluid distribution ways (7')-(7") (inlets and outlets), which are of dimensions that permit small movements to take place in its interior owing to the rolling of the seal, the axes of the inlet ways (7')-(7") and of the outlet way (7) or vice versa being disposed perpendicularly.

Seal movement means composed of: a bi-metal conductor (8) capable of contracting when an electrical voltage is applied to it, causing with its contraction the movement of the seal limited by lateral stops (10); and an opposing spring (9), disposed to keep the seal in dynamic equilibrium or take it up to its home position when no electrical voltage is applied to the bi-metal conductor (8).

The invention claimed is:

1. Continuous automatic fluid flow control and distributor valve, with a magnetic seal, that permits a flow of a fluid to be distributed among three inlet and outlet ways, one of which is shared and remains continuously open and the other two are progressive opening and closing type, the valve comprising:

a cylindrically-shaped seal made up of two identical ferromagnetic outer discs, which enclose between them another smaller-diameter concentric inner disc and a permanent magnet, the two outer discs having rims that are bevel-cut towards the inner magnetic disc, so that the three discs conjointly define a perimeter groove that acts as a housing for a spring ring which forms a direct means of sealing;

a valve body composed of two superimposed parts, one of which forms a rolling track of the outer discs with the bevelled rims of the seal and is of ferromagnetic material, the body being provided with an intercommunicating chamber between the fluid distribution ways, which are of dimensions that permit small movements to take place in an interior of the body due to rolling of the seal, axes of the inlet ways and of the outlet way or vice versa being disposed perpendicularly; and seal movement means composed of: a bi-metal conductor (8) capable of contracting when an electrical voltage is applied to it, causing with its contraction movement of the seal limited by lateral stops; and an opposing spring, disposed to keep the seal in dynamic equilibrium or take it up to a home position when no electrical voltage is applied to the bi-metal conductor.

* * * * *